US011546336B1

(12) United States Patent
Volpe et al.

(10) Patent No.: US 11,546,336 B1
(45) Date of Patent: Jan. 3, 2023

(54) INDEPENDENTLY CONFIGURABLE ACCESS DEVICE STAGES FOR PROCESSING INTERCONNECT ACCESS REQUESTS

(71) Applicant: Amazon Technologies, Inc., Seattle, WA (US)

(72) Inventors: Thomas A Volpe, Austin, TX (US); Mark Banse, Austin, TX (US)

(73) Assignee: Amazon Technologies, Inc., Seattle, WA (US)

( * ) Notice: Subject to any disclaimer, the term of this patent is extended or adjusted under 35 U.S.C. 154(b) by 691 days.

(21) Appl. No.: 16/660,715

(22) Filed: Oct. 22, 2019

(51) Int. Cl.
*H04L 9/40* (2022.01)
*G06F 16/9035* (2019.01)
*G06F 30/34* (2020.01)

(52) U.S. Cl.
CPC ........ *H04L 63/101* (2013.01); *G06F 16/9035* (2019.01); *G06F 30/34* (2020.01); *H04L 63/1408* (2013.01)

(58) Field of Classification Search
CPC .............................. H04L 63/10; H04L 63/101
See application file for complete search history.

(56) References Cited

U.S. PATENT DOCUMENTS

| | | | |
|---|---|---|---|
| 6,356,986 B1 | 3/2002 | Solomon et al. | |
| 7,185,192 B1 * | 2/2007 | Kahn | G06F 21/6218 707/999.102 |
| 7,585,593 B2 | 9/2009 | Chang | |
| 7,623,518 B2 | 11/2009 | Faulk, Jr. | |
| 7,657,694 B2 * | 2/2010 | Mansell | G06F 13/24 711/6 |
| 8,037,519 B2 * | 10/2011 | Kalofonos | H04L 63/0227 726/13 |
| 8,347,350 B2 | 1/2013 | Lum et al. | |
| 9,256,531 B2 | 2/2016 | Cho | |
| 9,342,258 B2 | 5/2016 | Thanner et al. | |
| 9,537,488 B1 * | 1/2017 | Atsatt | H03K 19/17748 |
| 10,078,113 B1 * | 9/2018 | Usgaonkar | G06F 11/322 |
| 10,141,026 B1 * | 11/2018 | Chen | G06F 12/1458 |
| 10,795,985 B2 * | 10/2020 | Attfield | G06F 21/62 |
| 11,074,206 B1 * | 7/2021 | Jalal | G06F 13/4013 |
| 11,175,839 B1 | 11/2021 | Volpe et al. | |
| 2005/0078694 A1 | 4/2005 | Oner | |
| 2006/0265759 A1 * | 11/2006 | Birrell | G06F 21/6218 726/27 |

(Continued)

OTHER PUBLICATIONS

IBM NN8806396, "Interrupt Pulse Mask Enable", IBM Technical Disclosure Bulletin, Jun. 1988 (Year: 1988); pp. 1-4.

(Continued)

*Primary Examiner* — Khang Do
(74) *Attorney, Agent, or Firm* — S. Scott Foster; Kowert, Hood, Munyon, Rankin & Goetzel, P.C.

(57) ABSTRACT

Access control lookups may be implemented that support user-configurable and host-configurable processing stages. A request may be received and evaluated to determine whether bypass of user-configured access request processing stages should be bypassed. A lookup may be determined for user-configured access controlled decisions, and the access control decisions can be applied, if not bypassed. A lookup may be determined for a host-configured access control decisions and the access control decisions applied.

20 Claims, 9 Drawing Sheets

(56) References Cited

U.S. PATENT DOCUMENTS

| | | |
|---|---|---|
| 2007/0204087 A1 | 8/2007 | Birenbach et al. |
| 2008/0154481 A1 | 6/2008 | Stroia et al. |
| 2011/0106993 A1 | 5/2011 | Arinobu et al. |
| 2011/0164692 A1* | 7/2011 | Kwon .................. G06F 13/387 375/259 |
| 2014/0149619 A1* | 5/2014 | Jeong ...................... G06F 13/14 710/110 |
| 2015/0082449 A1 | 3/2015 | Mushkatblat |
| 2015/0095623 A1 | 4/2015 | Ermolaev et al. |
| 2016/0139573 A1* | 5/2016 | Soni ........................ H04L 63/10 700/275 |
| 2017/0068811 A1* | 3/2017 | Liu ......................... G06F 21/74 |
| 2017/0139852 A1 | 5/2017 | Xu |
| 2017/0185539 A1* | 6/2017 | Xu .......................... G06F 21/74 |
| 2017/0255575 A1 | 9/2017 | Niu et al. |
| 2019/0220601 A1* | 7/2019 | Sood ...................... G06F 9/505 |
| 2020/0007414 A1* | 1/2020 | Smith ................... G06Q 30/08 |
| 2021/0019270 A1* | 1/2021 | Li ........................ G06F 13/4204 |
| 2021/0297451 A1* | 9/2021 | Raphael ............. H04L 41/0873 |

OTHER PUBLICATIONS

U.S. Appl. No. 16/660,716, filed Oct. 22, 2019, Thomas A. Volpe et al.

* cited by examiner

INDEPENDENTLY CONFIGURABLE ACCESS DEVICE STAGES FOR PROCESSING INTERCONNECT ACCESS REQUESTS

BACKGROUND

Cloud computing and other distributed computing environments often rely upon resource sharing to efficiently utilize resources to implement applications or to scale applications across resources as needed. Host systems, for instance, may implement various resources, such as various hardware resources, that can execute or otherwise implement user workloads as a tenant of the host system. Because applications can expose the host system (as well as other tenants) to intentionally malicious or poorly designed applications with wide impact, techniques to protect host system resources by controlling access requests to devices in a system are highly desirable.

Figure 1:
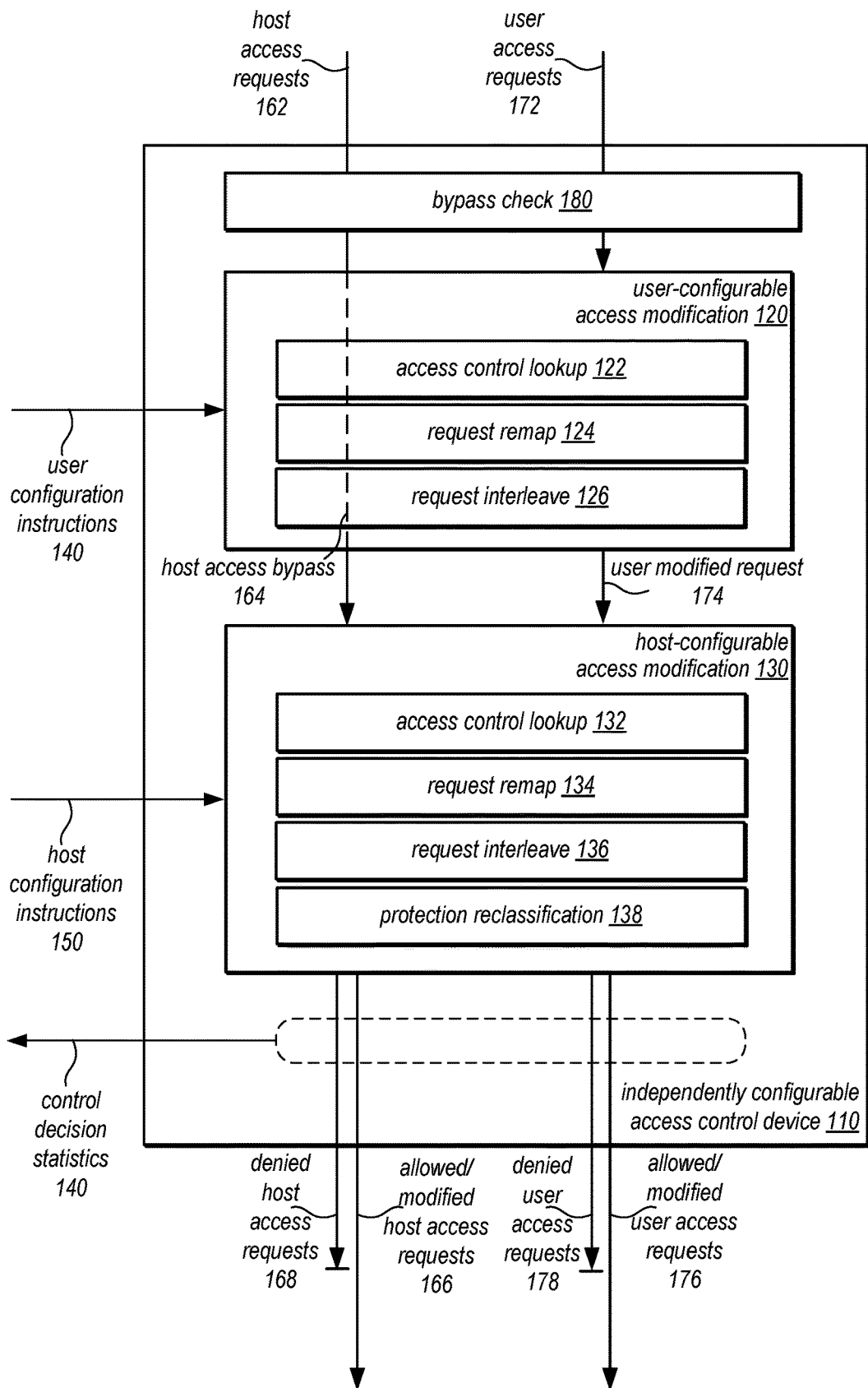
FIG. 1 illustrates a logical block diagram of an independently configurable access control device, according to some embodiments.

While embodiments are described herein by way of example for several embodiments and illustrative drawings, those skilled in the art will recognize that the embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. As used throughout this application, the word "may" is used in a permissive sense (i.e., meaning having the potential to), rather than the mandatory sense (i.e., meaning must). Similarly, the words "include", "including", and "includes" mean including, but not limited to.

This specification includes references to "one embodiment" or "an embodiment." The appearances of the phrases "in one embodiment" or "in an embodiment" do not necessarily refer to the same embodiment. Particular features, structures, or characteristics may be combined in any suitable manner consistent with this disclosure.

"Comprising." This term is open-ended. As used in the appended claims, this term does not foreclose additional structure or steps. Consider a claim that recites: "An apparatus comprising one or more processor units . . . " Such a claim does not foreclose the apparatus from including additional components (e.g., a network interface unit, graphics circuitry, etc.).

"Configured To." Various units, circuits, or other components may be described or claimed as "configured to" perform a task or tasks. In such contexts, "configured to" is used to connote structure by indicating that the units/circuits/components include structure (e.g., circuitry) that performs those task or tasks during operation. As such, the unit/circuit/component can be said to be configured to perform the task even when the specified unit/circuit/component is not currently operational (e.g., is not on). The units/circuits/components used with the "configured to" language include hardware—for example, circuits, memory storing program instructions executable to implement the operation, etc. Reciting that a unit/circuit/component is "configured to" perform one or more tasks is expressly intended not to invoke 35 U.S.C. § 112, paragraph (f), for that unit/circuit/component. Additionally, "configured to" can include generic structure (e.g., generic circuitry) that is manipulated by software or firmware (e.g., an FPGA or a general-purpose processor executing software) to operate in manner that is capable of performing the task(s) at issue. "Configure to" may also include adapting a manufacturing process (e.g., a semiconductor fabrication facility) to fabricate devices (e.g., integrated circuits) that are adapted to implement or perform one or more tasks.

"First," "Second," etc. As used herein, these terms are used as labels for nouns that they precede, and do not imply any type of ordering (e.g., spatial, temporal, logical, etc.). For example, a buffer circuit may be described herein as performing write operations for "first" and "second" values. The terms "first" and "second" do not necessarily imply that the first value must be written before the second value.

"Based On" or "Dependent On." As used herein, these terms are used to describe one or more factors that affect a determination. These terms do not foreclose additional factors that may affect a determination. That is, a determination may be solely based on those factors or based, at least in part, on those factors. Consider the phrase "determine A based on B." While in this case, B is a factor that affects the determination of A, such a phrase does not foreclose the determination of A from also being based on C. In other instances, A may be determined based solely on B.

DETAILED DESCRIPTION

Various techniques for independently configurable access device stages for processing access requests are described herein. Host systems, as discussed below with regard to FIG. 2, may provide resources to implement single or multiple user applications that are tenants, sharing and using the resources of the host system. In order to safeguard sensitive operations of the host system, as well as other tenant user applications, access controls may be implemented to limit or prevent erroneous or malicious attempts to access information or devices in a manner that is not permitted for security, privacy, or performance reasons. Access control devices may be implemented to control the access of a connected device to other devices implemented within or external to a host system. These other devices may be accessible via an interconnect, which may be one of various kinds of bus architectures to facilitate communications between devices connected to the interconnect. An access device may process access requests before transmission via the interconnect in order to enforce security, privacy, and other performance guarantees. Independently configurable access control devices may be implemented to allow both a host process and user processes to share in the access control features of an access device.

For example, an independently configurable access control device may implement host-configured or user-configured access controls to provide isolation between multiple tenants executing different user applications on the same hardware devices. In this way, the security advantages of implementing hardware-based access controls (as compared to software-based access controls) are available to both a host system as well as tenant's user application. For instance, the host-configured access controls can prevent tenants' user applications from accessing host-reserved or host-controlled resources or other devices, in some embodiments.

Other performance improvements for host and user applications may be achieved. An independently configurable access control device may implement user-configured access controls to support user application address remapping, which may allow software to be targeted to different hardware resources (e.g., different locations in a same memory to store respective results of different instantiations of the same software) without the need to recompile the software. In another example, user-configured access controls can implement address interleaving to allow a user application to distribute access requests (e.g., to load balance the access requests) across different hardware pathways (e.g., buses and memory), allowing for increased data throughput through the hardware pathways, improving the user application's performance. Similarly, host-configured access controls may allow host processes to take advantage of such features (e.g., remapping addresses to modify storage locations used by user applications or interleaving to implement load balancing via interleaving). In view of the above performance improvements, it may be apparent that an independently configurable access control device may allow for both user applications and host (e.g., a controller) to tune the performance of access requests via the interconnect to increase performance, reliability, and security. Moreover such performance improvements may be implemented without introducing conflict between the user applications and host.

Figure 2:
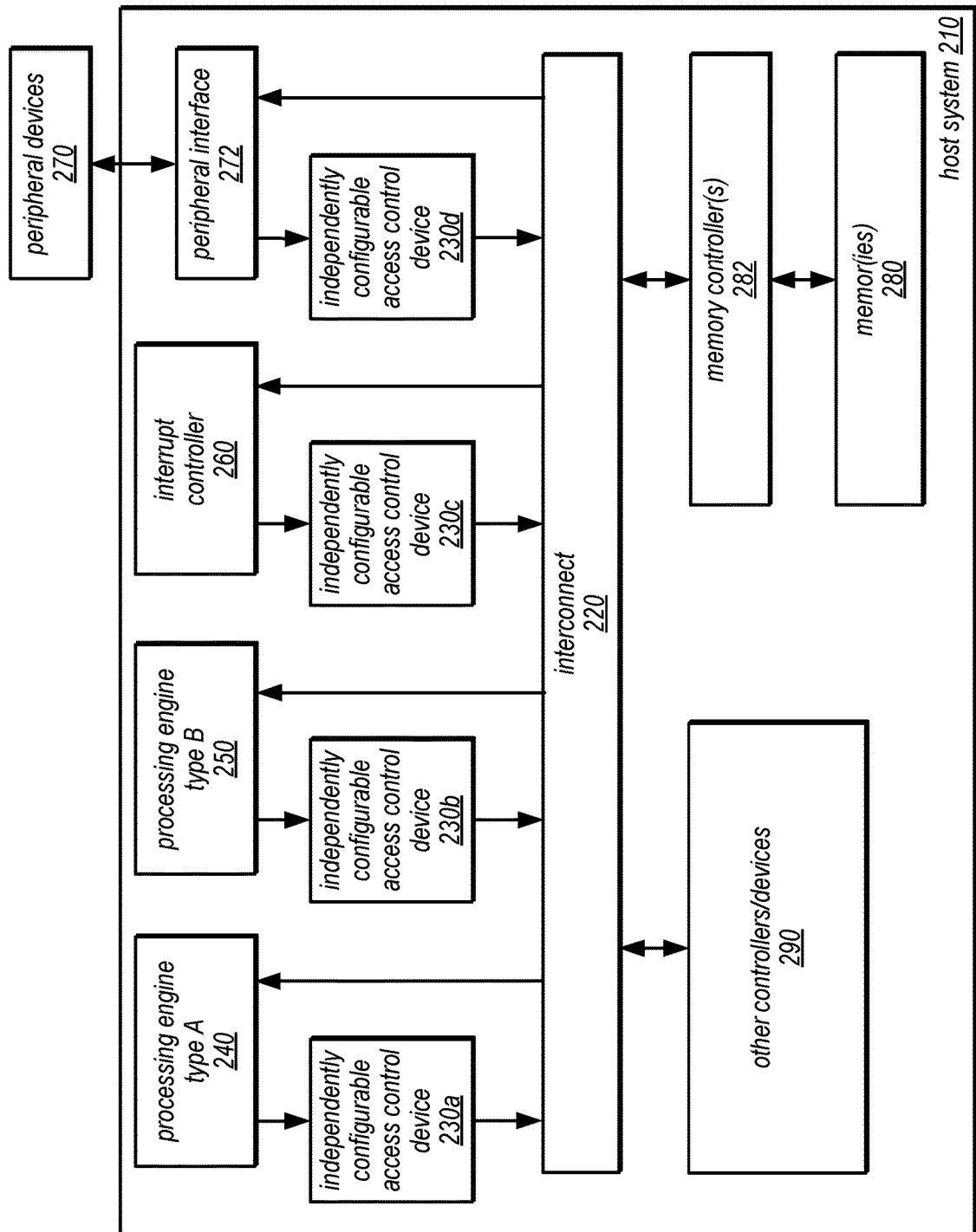
FIG. 2 a logical block diagram illustrating a host system that implements different processing engines and other components that can access other host devices via independently configurable access control devices connected to an interconnect, according to some embodiments.

FIG. 1 a logical block diagram of an independently configurable access control device, according to some embodiments. Independently configurable access control device 110 may be implemented as dedicated hardware channel to provide access to an interconnect for one or more connected hardware devices (as illustrated in FIG. 2), in various embodiments. For example, independently configurable access control device 110 may be implemented as or part of an application specific integrated circuit (ASIC), field programmable gate array (FPGA), system-on-a-chip (SoC), or other dedicated circuitry that processes various access requests from a connected device via an interconnect to another device. Independently configurable access control device 110 may have an interface (e.g., a slave or secondary interface, such as a bus interface) for an interconnect protocol in order to receive access requests from user applications or other software, such as user access requests 172 (e.g., generated by a user application), and requests from a host processes (e.g., a controller or controller-provoked request) on a connected device, such as host access requests 162.

Independently configurable access control device 110 may implement multiple access request processing stages, such as bypass check 180, user-configurable access modification 120 and host-configurable access modification 130, in some embodiments. Such stages may be programmed or otherwise configured independently from one another, in some embodiments. For example, user configuration instructions 140, may store, write, or configure features, parameters, entries, control values, or other inputs to access control lookup 122, request remap 124, and request interleave 126. An interface for multiple or individual components, such as CAM interface 350 discussed below with regard to FIG. 3) may be implemented to allow a user application to perform requests or otherwise provide user configuration instructions, in some embodiments. Similarly, host configuration instructions 150 may store, write, or configure features, parameters, entries, control values, or other inputs to access control lookup 122, request remap 124, request interleave 126, and protection reclassification 138. Similar to user configuration instructions 140, an interface for multiple or individual components, such as CAM interface 350 discussed below with regard to FIG. 3, may be implemented to allow a host process to perform requests or otherwise provide host configuration instructions 150 may be implemented, in some embodiments.

Implementing independently configurable access request processing stages may provide user applications and host processes with greater control of how access requests are handled. For instance, a user application can configure the features of user-configurable access modification 120, to accept or deny some access requests, specify different access control decisions in access control lookup 122, perform various modifications, such as request remapping 124 and request interleaving 126 that would otherwise have to be implemented within the user application, instead of in hardware, in some embodiments. In this way, a user application can take advantage of hardware-based features that can increase the performance of the user application beyond what would be capable using software-based implementations.

Allowing user applications to configure access request modification features may also not interfere with host processes specified access control requirements, in various embodiments. Bypass check 180, for instance, may recognize host access requests 162. For example, bypass check may compare a source identifier, such as a master identifier (e.g., an identifier of a device's interconnect transmission interface associated with user applications or host processes), with a bypass list so that the host access requests can bypass 164 the processing stages of user-configurable access modification 120. Host access requests 162 may instead begin access request control processing at host-configurable access modification 130. Moreover, as indicated at 174, a user modified or allowed request 174 may still pass through host-configurable access modification 130, allowing for any host processing control features or requirements not to be interfered with by user-configured control decisions. Instead, host-configured access control decisions may be made on top of or in addition to user-configured access control decisions (e.g., addresses remapped by a user request remap 124 may be remapped again by request remap 134 to implement host remapping features without necessarily interfering with the remapping for the user application, as it is the remapped address of user modified request 174 so that two differently remapped user requests may also be handled differently at host remapping 134).

Different features or components may be implemented in host-configurable access modification 130 when compared with user-configurable access modification, in some embodiments. Some inputs, conditions, states, instructions or operations available to be utilized in host-configurable access modification 130 may not be available in user-configurable access modification 120, such as protection reclassification 138. For instance, protection reclassification, may replace a protection type for specified in the access request according to an interconnect protocol (e.g., AXI's protection types ARPROT, AWPROT) with other defined protection types (e.g., specified in host configuration instructions 150 and stored in control status registers (CSRs)). A lookup to determine the protection type replacement may be based on a request identifier (e.g., AXI ID) or on a type of request (e.g., read or write), in some embodiments.

Independently configurable access control device 110 may also implement control decision statistics 140 collection, as discussed in more detail below with regard to FIG. 6. For example, denied host access requests 168, allowed and/or modified host access requests 166, denied user access requests 178, and allowed and/or modified user access requests 176 may be tracked to determine performance information. In some embodiments, request denials may be indicative of malicious or problematic behavior, which may be detected by monitoring components.

Please note that the previous description of an independently configurable access control device, as well as various access control decisions or modifications, are merely provided as an examples of an access control device that can be independently configured to process access requests sent via an interconnect. Different numbers of components or configuration of components may be implemented. For example, some host-configured or user-configured stages may be implemented in parallel.

This specification begins with general descriptions of an independently configurable access control device. Various examples of different components/modules, or arrangements of components/modules that may be implemented in the independently configurable access control device may then be discussed. A number of different methods and techniques to independently configurable access devices stages for access request control are then discussed, some of which are illustrated in accompanying flowcharts. Various examples are provided throughout the specification.

FIG. 2 is a logical block diagram illustrating a host system that implements different processing engines and other components that can access other host devices via independently configure access control devices to an interconnect, according to some embodiments. Host system 210 may be a computing system, including servers, desktop computers, mobile computing devices, or various other computing platforms, that may implement different devices that access other devices via an access control device for an interconnect. In some embodiments, host system 210 may be a system-on-a-chip, implemented or connected to other systems (e.g., as a card that implements various hardware-based functions or features for a server connected via a peripheral device to the server) to perform various specialized operations. For example, different hardware accelerators or processing engine types (e.g., graphics acceleration, machine learning acceleration, data processing acceleration, etc.) may be implemented on host system devices that perform work in response to requests or as part of implement user applications on behalf of an external system or device. In some embodiments, host system 210 may be implemented as part of a service provider network, which may offer hardware and software resources to clients, which may execute user applications as tenant on service provider network resources.

For example, in FIG. 2, host system 210 may implement different types of processing engines, such as processing engine type A 240 and processing engine type B 250. In one example embodiment, processing engine type A 240 may be specialized for machine learning calculations, such as neural network model calculations. In such an embodiment, processing engine type B 250, however, may be hardware that performs specialized compilation of machine learning applications that generate, train, and apply machine learning models on processing engine type A 240. As these processing engines may utilize resources of host system 210 that communicate over interconnect 220, respective independently configurable access control devices, such as independently configurable access control devices 230a and 230b may be connected for handling outbound access requests (e.g., to another component of host system 210, such as memor(ies) 280 via memory controller(s) 282).

Other devices of host system 210, connected to interconnect 220 may also benefit from or require independently configurable access control devices to optimize performance, security, and privacy. For example, an interrupt controller 260, which may handle various interrupts generated by other components of host system 210, may send access requests through independently configurable access control device 230c, and peripheral devices, such as peripheral devices 270, may utilization independently configurable access control device 230d connected to a peripheral interface 272 (e.g., Peripheral Component Interconnect Express (PCIe) interface) to send access requests via interconnect 260. For example, a peripheral device may be another SoC, another expansion card implemented on a server, or input/output device. In some embodiments, peripheral interface 272 may implement communications with another system, such as general purpose processor (e.g., a CPU) for a host server.

In some embodiments, interconnect 220 may be may be one of various different kinds of bus architectures, such as Advanced eXtensible Interface (AXI). Access requests, such as read or write requests, may be sent via interconnect 220 in order to reach a destination device, such as access requests sent from processing engine type A, sent via independently configurable access control device 230a to send read and write commands to memor(ies) 280.

In some embodiments, host system 210 may implement memor(ies) 280, which may be various types of memory technologies, such as Dynamic Random Access Memory (DRAM) (or other memory such as static random access memory (SRAM), synchronous dynamic RAM (SDRAM), nonvolatile/Flash-type memory, or any other type of memory). Memor(ies) 280 may store instructions, weights and other data for other devices of host system 210 (e.g., processing engines 240 and 250). Other controllers or devices 280 may be implemented and may also connect via interconnect 220. For example, other communication protocols and devices, such as Advanced Peripheral Bus (APB), Joint Test Action Group (JTAG), Universal Asynchronous Receiver/Transmitter (UART), Serial Peripheral Interface (SPI), and/or others may be implemented to, among other operations, program user-configurable access control decisions and host-configurable access control decisions, in addition to accessing or using other devices of host system 210.

Figure 3:
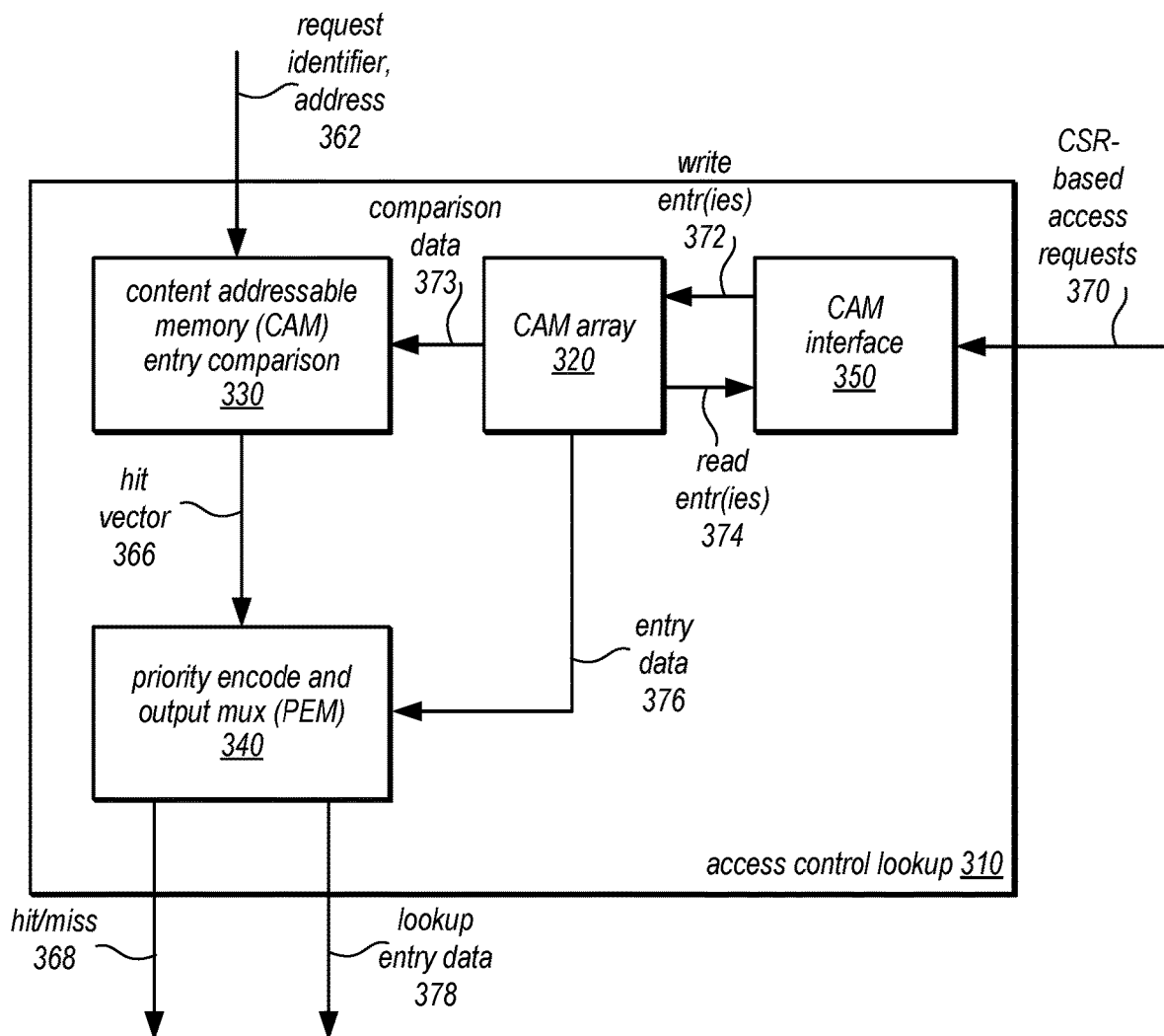
FIG. 3 is a logical block diagram illustrating access control lookup, according to some embodiments.

As discussed above, access control decisions can be configured for both user applications and host processes. Respective lookup stages to identify access control decisions may be implemented in order to implement hardware based lookup for different access requests. FIG. 3 is a logical block diagram illustrating access control lookup, according to some embodiments.

Access control lookup 310 may be implemented as part of different independently configurable access control device stages, such as access control lookup 132 and access control lookup 122. While different memories and lookup techniques may be implemented in different embodiments, in at least one embodiment content addressable memory (CAM) may be implemented. As illustrated in FIG. 3, CAM array 320 may store various entries that describe access control decisions that may be determined and/or applied from the contents of access control entries. Table 1 illustrates an example of entry fields, some of which may be limited to host processing stage.

TABLE 1

| Field | Size (bits) | Usage | Host Mode | User Mode | Description |
|---|---|---|---|---|---|
| Entry Valid | 1 | Control | Yes | Yes | Indicates the CAM entry is valid |
| ID Compare Disable | 1 | Control | Yes | No | Indicates that the Master ID should not be compared for this entry. |
| Master ID | 7 | Compare | Yes | Yes | Master ID used for compare |
| Compare Address | 36 | Compare | Yes | Yes | Address used for compare. Compared against bits 47-12 of the incoming address. |
| Compare Address Mask | 36 | Compare | Yes | Yes | Mask for bits 47-12 of Compare Address. When mask bit is set, the associated address bit will not be used in the comparison. |
| Remap Enable | 1 | Data | Yes | Yes | Indicates the CAM entry is used for Remap |
| Remap Address | 36 | Data | Yes | Yes | Address bits used to replace incoming address bits 47-12 when remap is enabled |
| Interleaving Enable | 1 | Data | Yes | Yes | Enables address interleaving for this entry |
| Write Pass | 1 | Data | Yes | Yes | Indicates if incoming write should be passed or denied |
| Read Pass | 1 | Data | Yes | Yes | Indicates if incoming read should be passed or denied |

Entries in CAM array 320 may be configured by writing entry values to locations in CAM array 320. For example, in some embodiments, an interface such as CAM interface 350 may be implemented. CAM interface 350 may accept commands or instructions and data to write via control status register access requests 370. CAM interface 370 may interpret the command, and perform the command, such as write entry 372 or read entry 374, taking data to write from the CSR. In some embodiments, entries in the CAM can be updated while the CAM is available for looking up requests. In some embodiments, CAM array 320 may store separate groups of entries for different users that have access to the access control device (e.g., identified by Master ID). In this way, the same access control device can be configured differently at the user-configuration stage for different users.

Lookups to determine access control decisions may be made by comparing entries from CAM array with lookup parameter(s). For example, a request identifier and/or address 362 may be provided to CAM entry comparison 330, which may compare 373 entry data to identify matching entr(ies) as a hit vector 366 (e.g., indicating an entry number, row, or location). In some scenarios no entry may match, in which case a default entry may be provided. The data for the matching entries may be provided to priority encode and output mux (PEM) 340. PEM 340 may identify from multiple matching entries in the hit vector the entry with the highest priority (e.g., the lower an index value the higher the priority). In this way, default or more widely applicable control decisions can be overridden by higher priority entries. PEM 340 may provide an indication of a hit or miss 368 (which may be collected as part of statistics discussed below with regard to FIG. 6) and the lookup entry data 378 (which may be default lookup entry data if the output is a miss 368), and which may include control decisions to be applied at later stages, in some embodiments.

Figure 4:
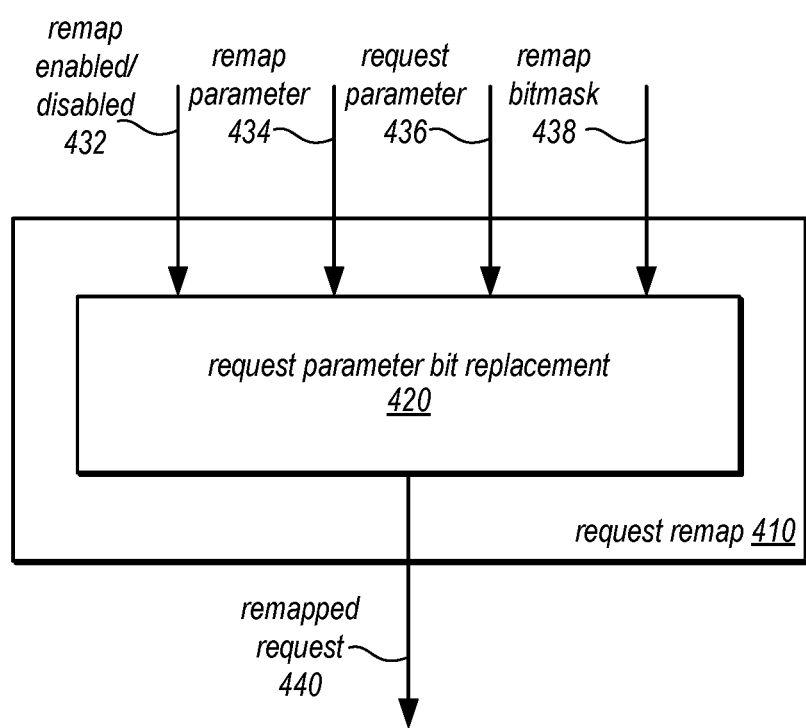
FIG. 4 is a logical block diagram illustrating an example request parameter remapping stage, according to some embodiments.

As discussed above with regard to FIG. 1, remapping techniques may be applied according user and/or host configurations in order to replace portions of an access request parameter (e.g., an address) with other values. FIG. 4 is a logical block diagram illustrating an example request parameter remapping stage, according to some embodiments. Request remap 410 may be implemented as part of different independently configurable access control device stages, such as request remap 134 and request remap 124. Remapping may be enabled or disabled 432 for an access request as a result of a determined control decision from a lookup, as discussed above with regard to FIG. 3. If disabled, then access request data may pass through the stage without modification, in some embodiments.

Request parameter bit replacement 420 may accept a remap parameter 434, request parameter 436, and remap bitmask 438, in some embodiments. Remap parameter 434 and remap bitmask 438 may be specified in a lookup entry (e.g., a CAM entry), in some embodiments. Request parameter 436, may be included in the access request. For example, request parameter 436 may be an address for an access request or may be an identifier for the access request. Request parameter bit replacement 420 may replace unmasked bits of the parameter with corresponding bits of the remap parameter. For example, if request parameter is "101101" and the bitmask is "110101" (where "1" is a mask) and the remap parameter is "110111" then the remapped request 440 would be "100111."

Figure 5:
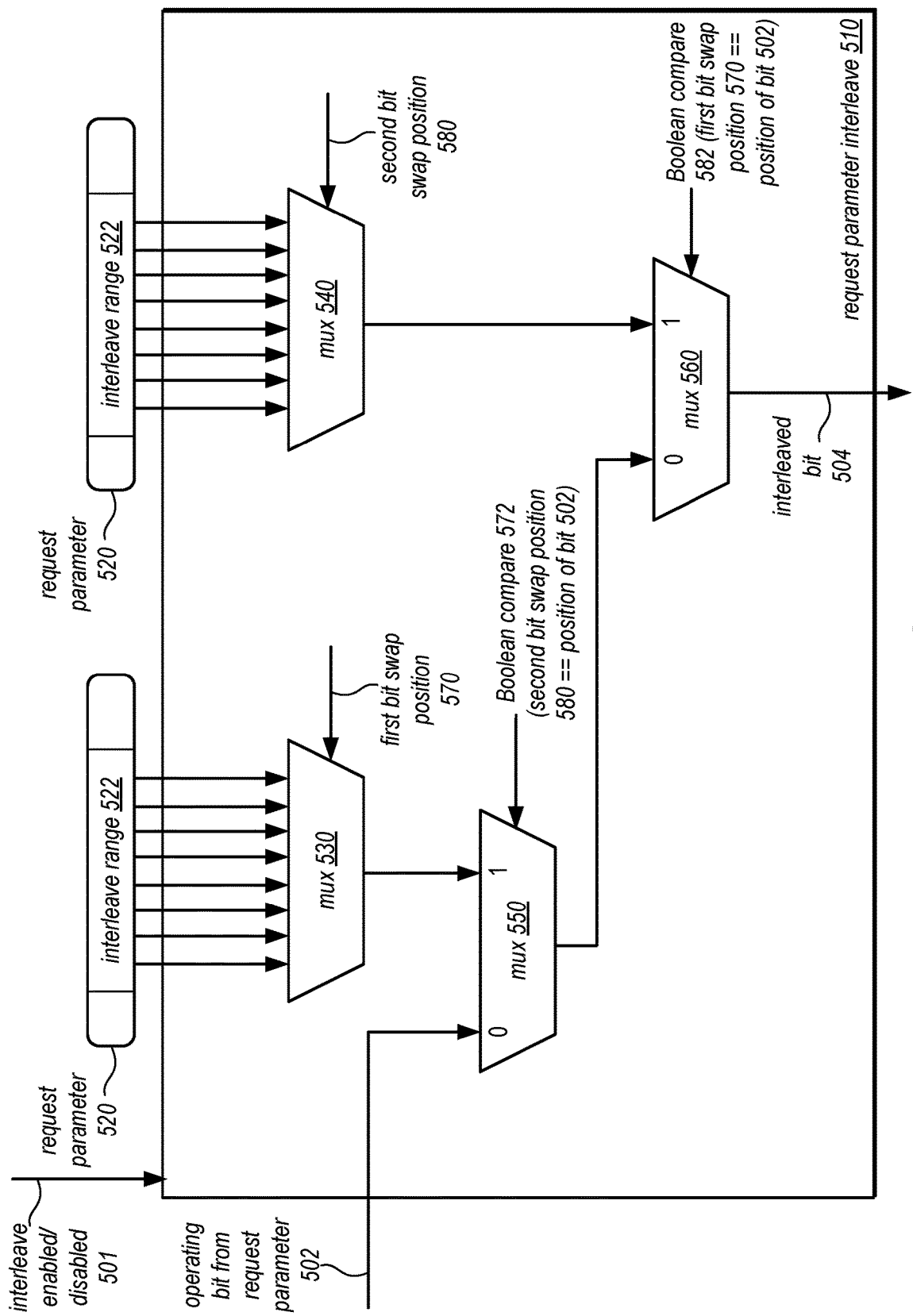
FIG. 5 is a logical block diagram illustrating an example request parameter interleaving stage, according to some embodiments.

As discussed above with regard to FIG. 1, interleaving techniques may be applied according user and/or host configurations in order to interleave portions of an access request parameter (e.g., an address) with other values. FIG. 5 is a logical block diagram illustrating an example request parameter interleaving stage, according to some embodiments. Request interleave stage 510 may be implemented as part of different independently configurable access control device stages, such as request interleave 136 and request interleave 126. Interleave may be enabled or disabled 501 for an access request as a result of a determined control decision from a lookup, as discussed above with regard to FIG. 3.

A control status register may include the features that control or implement the interleave technique in FIG. 5. For example, the interleave range 522 may be specified by a high bit and a low bit. Similarly, the bit positions to swap, such as first bit position 570 and second bit position 580, may be specified in a control status register (which may have been configured by a user process or host process). Alternatively, one or both features may be recorded in an entry of a CAM record, discussed above with regard to FIG. 3. Bit swap positions that are specified outside of interleave range 522 may, in some embodiments, be set to the maximum and/or minimum values of the interleave range.

An interleave technique may take two bit swap positions from a request parameter by evaluating one bit (the operating bit) at a time from the request parameter, in some embodiments. If the operating bit matches the first bit swap position, then that bit value may be swapped with the bit value of the second bit swap position. Likewise, if the operating bit value matches the second bit swap position, then that bit value may be swapped with the bit value of the first bit swap position. FIG. 5 illustrates an example implementation of such a technique. Respective multiplexers, mux 530 and mux 540, may be used to obtain bit values from the interleave range 522 of the request parameter (e.g., an address or request identifier). The bit swap positions 570 and 580 may be implemented as the selector feature. The output bit values (the bits to swap) from mux 530 and mux 540 may then be provided to mux 550 and mux 560 respectively.

At mux 550 and 560, the provided bits from mux 530 and mux 540 may be used to swap when an operating bit 502 matches a bit to be swapped. For instance, the selector of mux 550 is the output of a Boolean comparison 572 ("=") of the second bit swap position and the bit position of 502. If the output is true (e.g., "1"), then the bit value from mux 530 is used instead of the operating bit value. This is because the operating bit is the bit in the second bit swap position 580, and thus should have its value replaced with the value of the bit in from the first bit swap position 570, which may then be output as interleaved bit 504. Similarly, if the operating bit 502 has a position that matches the first bit swap position as determined at Boolean compare 582, then the bit value of operating bit 502 may be replaced with the bit value from the second bit swap position 580, which may then be output as interleaved bit 504. If operating bit is neither the first or second bit to swap, then operating bit 502 may retain its value when output as interleaved bit 504.

Figure 6:
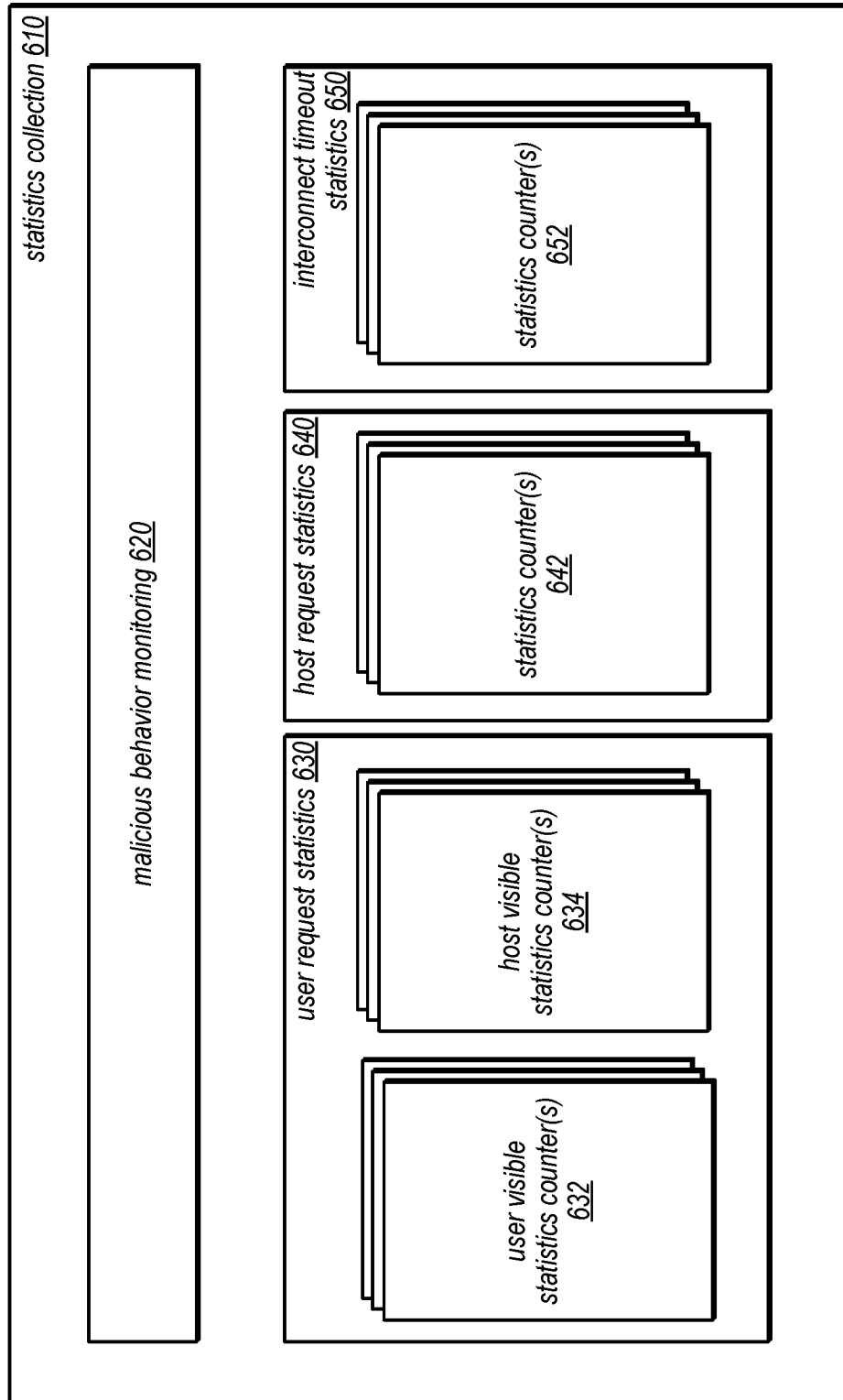
FIG. 6 is a logical block diagram illustrating statistics collection for an independently configurable access control device, according to some embodiments.

FIG. 6 is a logical block diagram illustrating statistics collection for an independently configurable access control device, according to some embodiments. Statistics collection 610 may be implemented as part of an access control device like interdependently configurable access control device 110 in FIG. 1, or may be separately implemented but with access to access control decisions and other tracked information. In some embodiments, statistics collection 610 may implement separate groups of resources, such as counters for user statistics and host statistics, in some embodiments. For instance, user request statistics 630 may be for a specific user (e.g., identified according to a master or primary identifier included as part of an interconnect protocol) and may include both user visible statistics counters 632 and host visible (and user invisible) statistics counters 634.

An application or controller for either users or the host system may read from and/or reset/clear the differently visible counters independently, in some embodiments. For example, a control interface to the access control device, such as APB or SPI, may allow a user application or host controller to read counter values by submitting read requests via the control interface. As indicated at 640, similar types of counters 642 may be implemented to track host request statistics 640, in some embodiments.

Different types of statistics may be collected for an access control device. For example, statistics for access control decisions and other access requests may include tracking the number of read requests passed, read requests denied, write requests passed, write requests denied, read requests with an error, write requests with an error, read requests that time out, and/or write requests that time out, in some embodiments. As indicated at 650, in some embodiments, timeout statistics for the interconnect 650 may be collected by counters 652. For example, a counter 652 may track the time each request is pending for the interconnect. If the time exceeds a threshold period, a timeout for that request may occur. In some embodiments, a timeout may cause a statistics counters 652 to update and may trigger an interrupt. In some embodiments, the threshold for the timeout period may be configurable (e.g., by a host process). Other interconnect timeout statistics may include, a number of read request timeouts that occur, read transaction timeouts that eventually complete, write transactions that time out and write transaction timeouts that eventually complete, in some embodiments.

In at least some embodiments, statistics collection 610 may also implement malicious behavior monitoring 620. For example, malicious behavior monitoring 620 may evaluate user request statistics for various criteria or patterns, such as a number of failed write request to different locations (e.g., which may indicate a probing action). Malicious behavior monitoring 620 may read from counters or other statistics storage devices on the access control device in order to determine whether criteria are matched or satisfied, or whether a matching pattern of access request results is present. In this way, hardware-based malicious behavior monitoring based on failures or other access request statistics collected at an access device (instead of a software application monitoring interactions) may be faster to evaluate and detect malicious behavior. Moreover, such detection may cause a faster response to the malicious behavior if, for instance, an interrupt or other signal of malicious behavior can be triggered by evaluating the hardware statistics counters alone. In some embodiments, the number of access requests may be indicative of a large increase in request volume, which may then be evaluated or considered for malicious behavior to tie up or not share host resources.

The examples of an independently configurable access control device as discussed above with regard to FIGS. 1-6 have been given in regard to an example access control device and host system. Note that various other types or configurations of devices or systems, or access control devices, may implement an access control device that receives user access requests and host access requests and thus may implement these techniques. In addition to examples given above, the techniques discussed below with regard to FIGS. 7-9 may be also implemented using the various components discussed above, as well as different types of systems or devices that provide access to devices via an interconnect.

Figure 7:
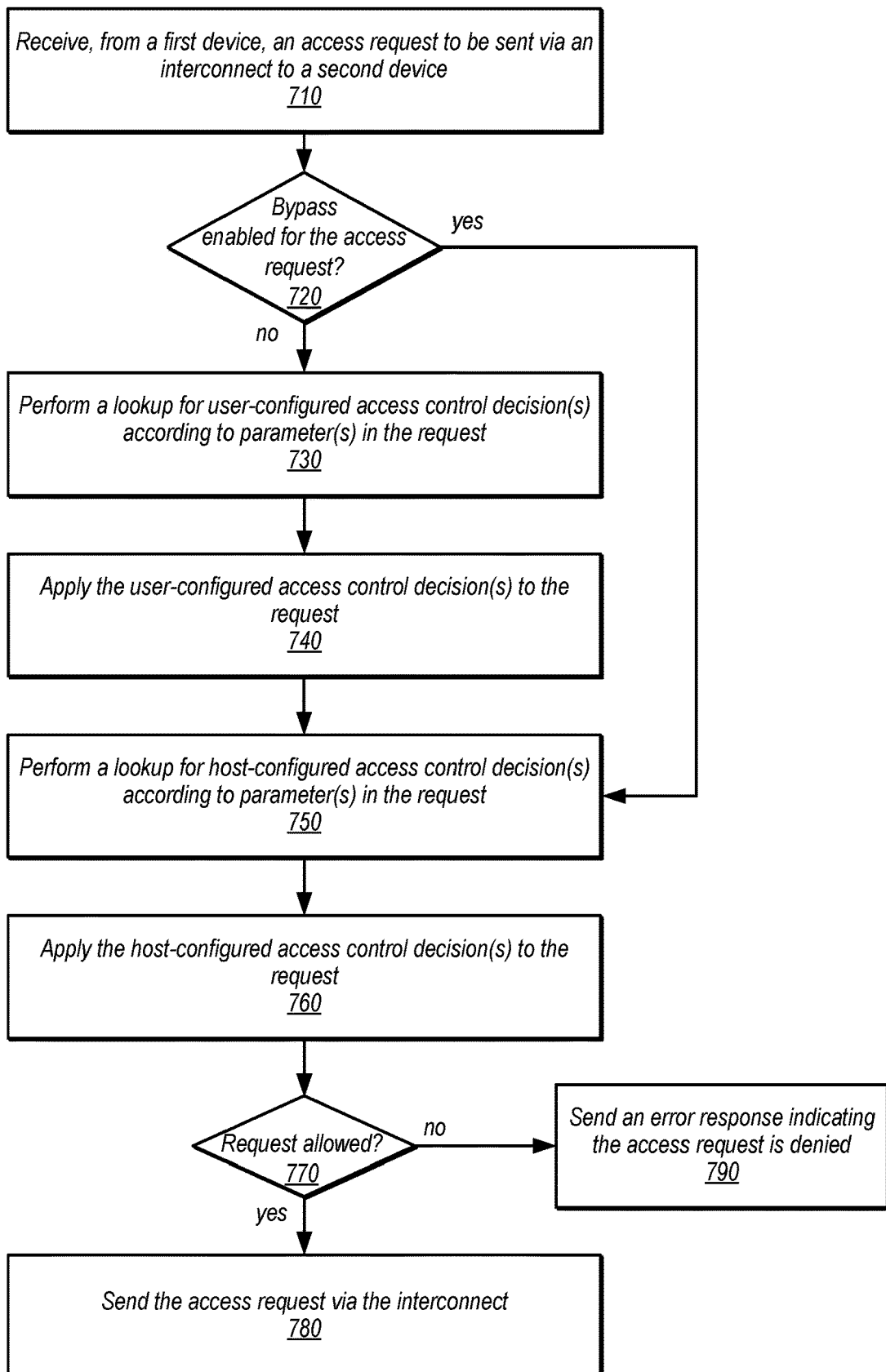
FIG. 7 is a high-level flowchart illustrating various methods and techniques to implement independently applying different access control decisions to access requests, according to some embodiments.

FIG. 7 is a high-level flowchart illustrating various methods and techniques to implement independently applying different access control decisions to an access request, according to some embodiments. As indicated at 710, an access request to be sent via an interconnect to a second device may be received, in some embodiments. For example, an access device as discussed above with regard to FIGS. 1 and 2, such as independently configurable access control devices 110 and 230, may implement an interface that accepts interconnect access requests (e.g., a slave interface or secondary interface). The access request may be formatted according to an interconnect protocol, in some embodiments. For example, the access request may be formatted according to the AXI protocol as the interconnect may be an AXI fabric. The access request may be a request to read data from or write data to the second device, in some embodiments.

As indicated at 720, a determination may be made as to whether bypass is enabled for the access request, in some embodiments. For example, a source or type of the access request (e.g., user application or host process) may automatically enable bypass for a host request. In some embodiments, an identifier, such as a master identifier, may be compared with a list of master identifiers which indicate which master identifiers have bypass enabled, and those that do not.

As indicated at 730, a lookup for user-configured access control decisions may be performed according to one (or more) parameters in the access request, in some embodiments. For example, as discussed above with regard to FIGS. 1 and 3, a memory such as a CAM may store entries that describe one or multiple access control decisions to be made with respect to the access request (e.g., operations to apply to the request, such as remapping or interleaving, or whether not the request is valid, and so on). The lookup may identify a first match, or highest priority matching entry in the CAM (or default entry), in some embodiments. In some embodiments, the CAM may be a hardware-based CAM implementation. In other embodiments, the CAM may be a simulated CAM implementation utilizing, for instance, register file hardware to implement CAM-like behavior. In other embodiments, different lookup techniques may be performed. For example, an index, such as a tree index structure or hashing index scheme may be implemented to locate a storage address (or other location information) for an entry describing access control decision(s) for the access request. The access control decision(s) may be configured by a user, utilizing an interface to write, store, enter, mark, or otherwise configure the decisions for the access request. For instance, as discussed above, a control status register interface may be used to perform writes to a memory device by writing the data and command to the control status register from which the data may be written to the memory. In some embodiments, control interfaces such as APB or SPI may be utilized to store or modify access decisions for subsequent lookups.

As indicated at 740, the user-configured access control decision(s) may be applied to the request, in some embodiments. Such access control decisions may include modifying or changing the access request (e.g., via remapping, interleaving or other data change operation). In some embodiments, an access control system may update a parameter value (e.g., from valid to invalid) or may output metadata describing the access request (e.g., a valid/invalid indication) which may be passed along with the access request as input to later access request processing stages. In some embodiments, an access control decision may include passing through the access request unchanged, without modification (although in some instances metadata for the access request may still be updated).

As indicated at 750, a lookup for host-configured access control decisions may be performed according to one (or more parameters) in the access request, in some embodiments. Similar to the discussion above with regard to element 730, a memory such as a CAM may store entries that describe one or multiple access control decisions to be made with respect to the access request (e.g., operations to apply to the request, such as remapping or interleaving, whether the request is valid, whether or not protection reclassification is to be applied and so on). The lookup may identify a first match, or highest priority matching entry in the CAM, in some embodiments. If no match is found, then a default entry (which may be the lowest priority entry in the CAM) may be used, in some embodiments. In other embodiments, different lookup techniques may be performed. For example, an index, such as a tree index structure or hashing index scheme may be implemented locate a storage address for an entry describing access control decision(s) for the access request. The access control decision(s) may be configured by a host process, utilizing an interface to write, store, enter, mark, or otherwise configure the decisions for the access request. For instance, as discussed above, a control status register may be used to perform writes to a memory device by writing the data and command to the control status register from which the data may be written to the memory.

As indicated at 760, the host-configured access control decision(s) may be applied to the request, in some embodiments. Such access control decisions may include modification or changing the access request (e.g., via remapping, interleaving or other data change operation). In some embodiments, an access control system may update a parameter value (e.g., from valid to invalid) or may output metadata describing the access request (e.g., a valid/invalid indication) which may be passed along with the access request as input to later access request processing stages. In some embodiments, an access control decision may include passing through the access request unchanged, without modification (although in some instances metadata for the access request may still be updated).

As indicated at 770, a determination may be made as to whether the request is allowed, in some embodiments. For example, a valid parameter, field, metadata, or other indication may be determined at lookup elements 730 and/or 750. If the access request is identified as valid, then, the request may be allowed. As indicated at 780, the allowed access request may be sent via the interconnect to the second device, in some embodiments. For access requests not allowed, as indicated by the negative exit from 770, an error response indicating the access request is denied may be sent, in some embodiments. The error response may include a rationale, explanation, or error code in some embodiments.

Figure 8:
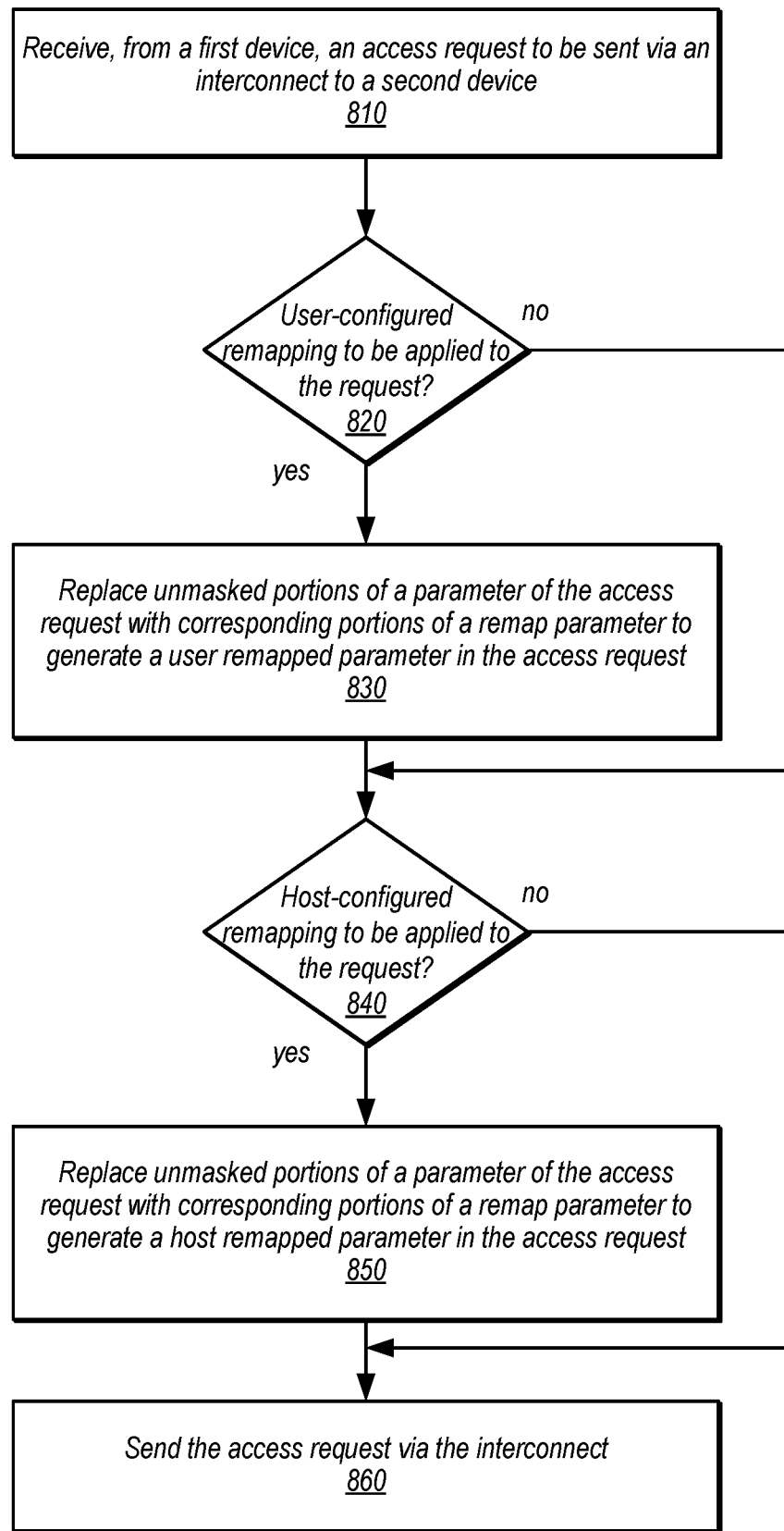
FIG. 8 is a high-level flowchart illustrating various methods and techniques to implement independently configurable remapping stages for processing access requests to send via an interconnect, according to some embodiments.

FIG. 8 is a high-level flowchart illustrating various methods and techniques to implement independently configurable remapping stages for processing access requests to send via an interconnect, according to some embodiments. As indicated at 810, an access request to be sent via an interconnect to a second device may be received, in some embodiments. For example, an access device as discussed above with regard to FIGS. 1 and 2, such as independently configurable access control devices 110 and 230, may implement an interface that accepts interconnect access requests (e.g., a slave interface or secondary interface). The access request may be formatted according to an interconnect protocol, in some embodiments. For example, the access request may be formatted according to the AXI protocol as the interconnect may be an AXI fabric. The access request may be a request to read data from or write data to the second device, in some embodiments.

As indicated at 820, a determination may be made as to whether user-configured remapping is to be applied to the request, in some embodiments. For example, as discussed above with regard to FIGS. 1 and 3, CAM memory may be utilized to lookup a matching entry (or multiple matching entries or a default entry) in order to select the entry in the CAM that specifies control decisions, including remapping decisions, for the access request. In some embodiments, other lookup techniques may be implemented, such as search trees or hash indexes which may utilize a lookup parameter to identify a decision as to whether remapping is to be applied as part of a user-configured remapping stage for processing the access request.

If user-configured remapping is to be applied, as indicated by the positive exit from 820, unmasked portions of a parameter of the access request may be replaced with corresponding portions of a remap parameter to generate a user remapped parameter in the access request, as indicated at 830. As noted earlier, the parameter may include an address that is the destination or target of the access request. In some embodiments, the parameter may be an identifier associated with the access request (e.g., AXI's transaction ID). Techniques to remap portions of the parameter may include those discussed above with regard to FIG. 4, utilizing user-configured remap bitmask and remap parameter values to replace the portions in the parameter. Note, however, that other techniques to remap portions of the parameter can be implemented and thus the previous techniques are not intended to be limiting. The user generated remap parameter in the access request may be included in a modified access request which may be processed through other access device stages (e.g., for applying other user-configured access control decisions or for host-configured access control decisions).

As indicated at 840, a determination as to whether a host-configured remapping is to be applied to the request may be determined, in some embodiments. As discussed above with regard to element 820, a CAM memory may be utilized to lookup a matching entry (or multiple matching entries or a default entry) in order to select the entry in the CAM that specifies control decisions configured by a host, including remapping decisions, for the access request. In some embodiments, other lookup techniques may be implemented, such as search trees or hash indexes which may utilize a lookup parameter to identify a decision as to whether remapping is to be applied as part of a host-configured remapping stage for processing the access request. In some embodiments, the lookup technique, structure, component, or other mechanism may differ between host-configured interleaving determinations and user-configured interleaving determinations.

As indicated at 850, unmasked portions of a parameter of the access request may be replaced with corresponding portions of a remap parameter to generate a host remapped parameter in the access request, in some embodiments. Similar to the discussion above with regard to element 830, the parameter may include an address that is the destination or target of the access request. In some embodiments, the parameter may be an identifier associated with the access request (e.g., AXI's transaction ID). In some embodiments, the parameter remapped for a host-configured remapping stage may be the same as user-configured remapping stage and thus may overwrite, replace, or alter a user configured remapping stage if both are enabled. In some scenarios, remapping may be applied to different parameters at the user-configured remapping stage and host-configured remapping stage.

Again, techniques to replace portions of the parameter may include those discussed above with regard to FIG. 4, utilizing user-configured bitmasks and remap parameters. Note, however, that other techniques to remap or otherwise replace portions of the parameter can be implemented and thus the previous techniques are not intended to be limiting. The host generated remapped parameter in the access request may be included in a modified access request which may be processed through other access device stages (e.g., for applying other host-configured access control decisions).

As indicated at 860, the access request may then be sent via the interconnect, in some embodiments. The request may include one or both of the host remapped parameter and the user remapped parameter. Invalid requests or erroneous requests, as discussed above with regard to FIGS. 1 and 7 may not be sent.

Figure 9:
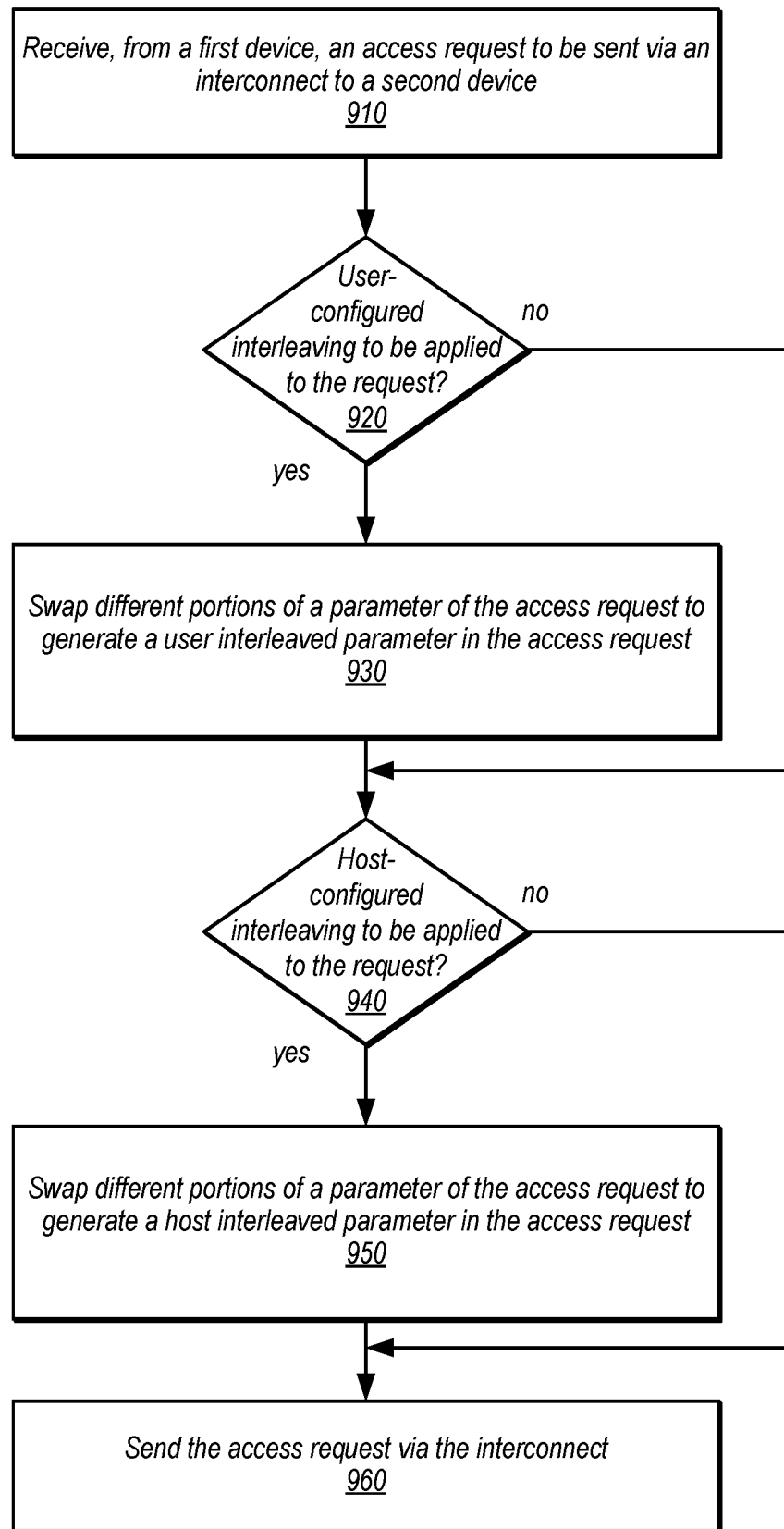
FIG. 9 is a high-level flowchart illustrating various methods and techniques to implement independently configurable interleaving stages for processing access requests to send via an interconnect, according to some embodiments.

FIG. 9 is a high-level flowchart illustrating various methods and techniques to implement independently configurable interleaving stages for processing access requests to send via an interconnect, according to some embodiments. As indicated at 910, an access request to be sent via an interconnect to a second device may be received, in some embodiments. For example, an access device as discussed above with regard to FIGS. 1 and 2, such as independently configurable access control devices 110 and 230, may implement an interface that accepts interconnect access request (e.g., a slave interface or secondary interface). The access request may be formatted according to an interconnect protocol, in some embodiments. For example, the access request may be formatted according the AXI protocol as the interconnect may be an AXI fabric. The access request may be a request to read data from or write data to the second device, in some embodiments.

As indicated at 920, a determination may be made as to whether user-configured interleaving is to be applied to the request, in some embodiments. For example, as discussed above with regard to FIGS. 1 and 3, CAM memory may be utilized to lookup a matching entry (or multiple matching entries or a default entry) in order to select the entry in the CAM that specifies control decisions, including interleaving decisions, for the access request. In some embodiments, other lookup techniques may be implemented, such as search trees or hash indexes which may utilize a lookup parameter to identify a decision as to whether interleaving is to be applied as part of a user-configured interleaving stage for processing the access request.

If user-configured interleaving is to be applied, as indicated by the positive exit from 920, different portions of a parameter of the access request may be swapped to generate a user of interleaved parameter in the access request, as indicated at 930. As noted earlier, the parameter may include an address that is the destination or target of the access request. In some embodiments, the parameter may be an identifier associated with the access request (e.g., AXI's transaction ID). Techniques to swap portions of the parameter may include those discussed above with regard to FIG. 5, utilizing user-configured bit positions to swap as selectors for the multiplexers to that accept a range or window of bit values in the parameter. Note, however, that other techniques to interleave or otherwise swap two (or more) portions of the parameter can be implemented and thus the previous techniques are not intended to be limiting. The user generated interleaved parameter in the access request may be included in a modified access request which may be processed through other access device stages (e.g., for applying other user-configured access control decisions or for host-configured access control decisions).

As indicated at 940, a determination as to whether a host-configured interleaving is to be applied to the request may be determined, in some embodiments. As discussed above with regard to element 920, a CAM memory may be utilized to lookup a matching entry (or multiple matching entries or a default entry) in order to select the entry in the CAM that specifies control decisions configured by a host, including interleaving decisions, for the access request. In some embodiments, other lookup techniques may be implemented, such as search trees or hash indexes which may utilize a lookup parameter to identify a decision as to whether interleaving is to be applied as part of a host-configured interleaving stage for processing the access request. In some embodiments, the lookup technique, structure, component, or other mechanism may differ between host-configured interleaving determinations and user-configured interleaving determinations.

As indicated at 950, different portions of a parameter of the access request may be swapped to generate a host interleaved parameter in the access request, in some embodiments. Similar to the discussion above with regard to element 930, the parameter may include an address that is the destination or target of the access request. In some embodiments, the parameter may be an identifier associated with the access request (e.g., AXI's transaction ID). In some embodiments, the parameter interleaved for a host-configured interleaving stage may be the same as user-configured interleaving stage and thus may overwrite, replace, or alter a user configured interleaving stage if both are enabled. In some scenarios, interleaving may be applied to different parameters at the user-configured interleaving stage and host-configured interleaving stage.

Again, techniques to swap portions of the parameter may include those discussed above with regard to FIG. 5, utilizing user-configured bit positions to swap as selectors for the multiplexers to that accept a range or window of bit values in the parameter. Note, however, that other techniques to interleave or otherwise swap two (or more) portions of the parameter can be implemented and thus the previous techniques are not intended to be limiting. The host generated interleaved parameter in the access request may be included in a modified access request which may be processed through other access device stages (e.g., for applying other host-configured access control decisions).

As indicated at 960, the access request may then be sent via the interconnect to the second device, in some embodiments. The request may include one or both of the host interleaved parameter and the user-interleaved parameter. Invalid requests or erroneous requests, as discussed above with regard to FIGS. 1 and 7 may not be sent.

Various ones of the methods described herein may be implemented in software, hardware, or a combination thereof, in different embodiments. In addition, the order of the blocks of the methods may be changed, and various elements may be added, reordered, combined, omitted, modified, etc. Various modifications and changes may be made as would be obvious to a person skilled in the art having the benefit of this disclosure. The various embodiments described herein are meant to be illustrative and not limiting. Many variations, modifications, additions, and improvements are possible.

Boundaries between various components and operations are somewhat arbitrary, and particular operations are illustrated in the context of specific illustrative configurations. Other allocations of functionality are envisioned and may fall within the scope of claims that follow. Finally, structures and functionality presented as discrete components in the exemplary configurations may be implemented as a combined structure or component. These and other variations, modifications, additions, and improvements may fall within the scope of embodiments as defined in the claims that follow.

Various modifications and changes may be made as would be obvious to a person skilled in the art having the benefit of this disclosure. It is intended that the invention embrace all such modifications and changes and, accordingly, the above description to be regarded in an illustrative rather than a restrictive sense.

What is claimed is:

1. A host system, comprising:
   a plurality of devices connected to an interconnect, wherein at least one of the devices is connected to the interconnect via an independently configurable access device;
   the independently configurable access device, configured to:
   receive an access request from a first one of the devices executing user instructions to send to a second one of the devices via the interconnect;
   determine a user-configured access control decision for the access request, wherein the user-configured access control decision is determined from a lookup for an applicable user-configured access control decision for the access request and according to a parameter of the access request;
   modify the access request according to the determined user-configured access control decision;
   determine a host-configured access control decision for the access request, wherein the host-configured access control decision is determined from a lookup for an applicable user-configured access control decision for the access request and according to the parameter of the access request or another parameter of the access request;
   modify the access request according to the determined host-configured access control decision; and
   send the modified access request to the second device via the interconnect.

2. The host system of claim 1, wherein the independently configurable access device is further configured to evaluate the access request to determine that bypass of user-configured access control decisions is not enabled for the access request.

3. The host system of claim 1, wherein the first device is executing user instructions that cause the access request to be sent and wherein the independently configurable access device is further configured to:
   add a result of the determined access control decisions to a user visible counter and to a host visible counter that track statistics of access control decisions for a user.

4. The host system of claim 1, wherein the access request is associated with a first user, wherein the lookup for the applicable user-configured access control decision for the access request is performed using a content addressable memory (CAM) that stores entries specified for a first user, and wherein the CAM stores additional entries specified for a second user that are accessed to perform a lookup for an applicable access control decision configured for the second user responsive when an access request associated with the second user is received.

5. A method, comprising:
   receiving, from a first device, an access request to be sent via an interconnect of a host system to a second device;
   performing a lookup for a user-configured access control decision for the access request according to a parameter in the access request;

applying the user-configured access control decision to
the access request;
performing a lookup for a host-configured access control
decision for the access request according to the parameter in the access request or another parameter in the
access request;
applying the host-configured access control decision to
the access request; and
sending the access request via the interconnect to the
second device.

6. The method of claim 5,
wherein performing the lookup for the user-configured
access control decision for the access request according
to the parameter in the access request comprises comparing the parameter with one or more entries in a first
content addressable memory (CAM) to select one of
the entries that describes the user-configured access
control decision for the access request; and
wherein performing the lookup for the host-configured
access control decision for the access request according
to the parameter in the access request or the other
parameter in the access request comprises comparing
the parameter or the other parameter with one or more
entries in a second content addressable memory (CAM)
to select one of the entries that describes the hostconfigured access control decision for the access
request.

7. The method of claim 6, further comprising:
storing, via a first interface, the one or more entries in the
first CAM; and
storing, via a second interface, the one or more entries in
the second CAM.

8. The method of claim 7, wherein the storing the one or
more entries in the first CAM and the storing the one or more
entries in the second CAM are performed when the first
CAM and the second CAM are available for performing
lookups for other access requests.

9. The method of claim 6, wherein the access request
includes a protection type parameter, and wherein the
method further comprises replacing the protection type
parameter with a host-configured protection type parameter.

10. The method of claim 5, wherein the first device is
executing user instructions that cause the access request to
be sent, and wherein the method further comprises:
adding a result of the applied access control decisions to
a user visible counter and to a host visible counter that
track statistics of access control decisions for a user.

11. The method of claim 10, further comprising monitoring the statistics of access control decisions for the user to
detect malicious behavior.

12. The method of claim 5, further comprising:
receiving a second access request to be sent via the
interconnect of the host system to the second device;
determining that the second access request bypasses userconfigured access control decisions;
performing a lookup for a host-configured access control
decision for the second access request according to the
parameter in the second access request;
applying the host-configured access control decision to
the second access request; and
sending an error response to the first device indicating that
the second access request is denied, wherein the userconfigured access control decision applied to the second access request marked the access request as
invalid.

13. The method of claim 5, further comprising:
receiving, from the first device, a second access request to
be sent via the interconnect of the host system to the
second device;
performing a lookup for a user-configured access control
decision for the second access request according to a
parameter in the second access request;
applying the user-configured access control decision to
the second access request; and
sending an error response to the first device indicating that
the second access request is denied, wherein the userconfigured access control decision applied to the second access request marked the second access request as
invalid.

14. An access device configured to connect to an interconnect, the access device comprising circuitry configured
to:
receive, from a first device, an access request to be sent
via the interconnect of a host system to a second device;
lookup in a first memory whether a user-configured access
control decision is applicable to the access request
according to a parameter in the request;
lookup in a second memory whether a host-configured
access control decision is applicable to the access
request according to the parameter in the request or
another parameter in the request; and
send a version of the access request via the interconnect
to the second device that is modified according to those
applicable access control decisions found from the
lookups.

15. The access device of claim 14,
wherein the first memory is a first content addressable
memory (CAM) and wherein the second memory is a
second CAM;
wherein to lookup in the first memory whether the userconfigured access control decision is applicable to the
access request according to the parameter in the
request, the circuitry is configured to compare the
parameter with one or more entries in the first CAM to
select one of the entries that describes the user-configured access control decision for the access request; and
wherein to lookup in the second memory whether the
host-configured access control decision is applicable to
the access request according to the parameter in the
request or another parameter in the request, the circuitry is configured to compare the parameter or the
other parameter with one or more entries in the second
CAM to select one of the entries that describes the
host-configured access control decision for the access
request.

16. The access device of claim 15, wherein the circuitry
is further configured to:
store, via a first interface, the one or more entries in the
first CAM; and
store, via a second interface, the one or more entries in the
second CAM.

17. The access device of claim 14, wherein the circuitry
is further configured to evaluate the access request to
determine that bypass of user-configured access control
decisions is not enabled for the access request.

18. The access device of claim 14, wherein the first device
is executing user instructions that cause the access request to
be sent, and wherein the circuitry is further configured to:
add a result of the found access control decisions to a user
visible counter and to a host visible counter that track
statistics of access control decisions for a user.

19. The access device of claim 14, wherein the access request includes a protection type parameter, and wherein the circuitry is further configured to replace the protection type parameter with a host-configured protection type parameter.

20. The access device of claim 14, wherein the access device is implemented as part of an application specific integrated circuit (ASIC), a system-on-chip (SoC), or a field-programmable gate array (FPGA).

* * * * *